(No Model.)

F. A. STOHLMANN.
ART OF CONSTRUCTING SURGICAL INSTRUMENTS OF GLASS.

No. 418,247. Patented Dec. 31, 1889.

Witnesses
J. Stait
Chas. H. Smith

Inventor
Frederick A. Stohlmann
per Lemuel W. Serrell atty

N. PETERS, Photo-Lithographer, Washington, D. C.

UNITED STATES PATENT OFFICE.

FREDERICK A. STOHLMANN, OF BROOKLYN, ASSIGNOR TO GEORGE TIEMANN & CO., OF NEW YORK, N. Y.

ART OF CONSTRUCTING SURGICAL INSTRUMENTS OF GLASS.

SPECIFICATION forming part of Letters Patent No. 418,247, dated December 31, 1889.

Application filed January 9, 1889. Serial No. 295,859. (No model.)

*To all whom it may concern:*

Be it known that I, FREDERICK A. STOHLMANN, of Brooklyn, in the county of Kings and State of New York, have invented an Improvement in the Art of Constructing Surgical Instruments of Glass, of which the following is a specification.

In the manufacture of surgical instruments, especially syringes, efforts have heretofore been made to unite hard-rubber end pieces to glass cylindrical barrels by fitting such end pieces tightly and making use of cement, and similar efforts have been employed for uniting glass globes to rings or flanges; but in all such instances the rubber has been liable to slip upon the glass and the parts to become detached. I have discovered that when the rubber is applied to the glass in a soft condition and vulcanized directly upon the glass the heat produces such a union between the two parts that the rubber is not liable to slip off or become detached, and this union is still further promoted by roughening or indenting the surface of the glass upon which the rubber is applied, and when the heat employed in vulcanizing is as high as usual in curing hard rubber the union between such rubber and the glass is still more intimate, and hence the hard rubber can be turned up and screw-threads, shoulders, or ornaments formed upon the same in the manner usual in the manufacture of hard-rubber goods, and the hard rubber does not become detached from the glass in so doing.

Figure 1:
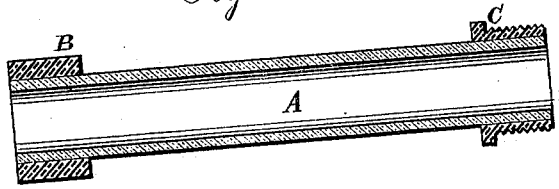
Figure 3:
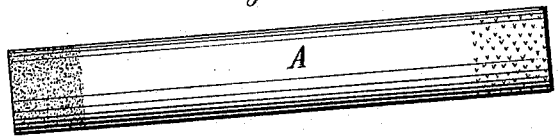
Figure 2:
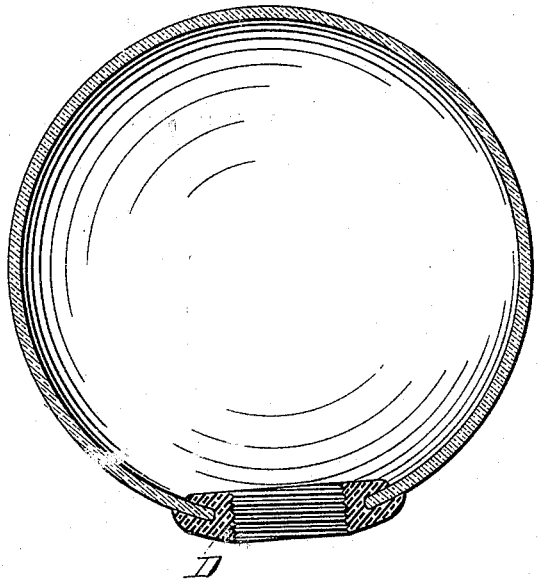

In the drawings, Figure 1 is a section illustrating the barrel of a syringe with the rubber ends thereon, and Fig. 2 is a section illustrating a glass globe with the rubber collar applied thereto. Fig. 3 represents the glass cylinder with the end portions roughened.

From the foregoing it will be understood that the rubber in the ordinary unvulcanized condition is applied to the glass, and, being adhesive, it sticks sufficiently firmly to the glass; but molds may be made use of to compress the rubber to the glass and hold the same during the vulcanizing operation, and where the rubber is applied to the glass the surface thereof is preferably roughened or indented, as indicated at the end portions, Fig. 3, in order that the rubber may more firmly unite with the glass, and where the rubber is to be in a soft condition after vulcanizing it will not be exposed to as high a temperature as it is when such rubber is to be converted into the hard non-elastic rubber usual in various instruments made of hard rubber.

By my improvement I am able to use a cylindrical barrel A of glass, with the hard rubber ends B C vulcanized upon the glass, and with screw-threads cut in such hard rubber for receiving the cap and the movable end and tube heretofore employed in syringes, and the syringe is rendered much more durable than those heretofore manufactured, because the rubber ends will not become separated from the glass when in use.

In Fig. 2 the rubber ring D is shown as applied to the opening in a glass globe, and this rubber ring is screw-threaded after the rubber has been vulcanized to the glass.

It is to be understood that in uniting the rubber and glass by the vulcanizing operation such quality of glass is to be made use of that will stand the heat necessary in vulcanizing without fracturing such glass.

I claim as my invention—

The improvement in the art of constructing surgical instruments of glass, which consists in attaching the hard-rubber end pieces or screw-threaded terminals thereof to the glass without the use of cement by placing the same in position in a plastic state and then causing them to firmly adhere by vulcanizing them thereon at the proper temperature, substantially as set forth.

Signed by me this 7th day of January, 1889.

FREDERICK A. STOHLMANN.

Witnesses:
GEO. T. PINCKNEY,
WILLIAM G. MOTT.